United States Patent [19]
Haynes

[11] 3,841,604
[45] Oct. 15, 1974

[54] BUMPER JACK
[76] Inventor: Mary B. Haynes, 5322 W. Cambridge, Phoenix, Ariz. 85035
[22] Filed: July 30, 1973
[21] Appl. No.: 383,795

[52] U.S. Cl. ............................... 254/111, 254/134
[51] Int. Cl. ........................... B66f 1/04, B66f 3/00
[58] Field of Search ............ 254/133, 134, 105–111, 254/99–103

[56] References Cited
UNITED STATES PATENTS

| | | | |
|---|---|---|---|
| 2,548,944 | 4/1951 | Chapman | 254/133 R |
| 2,616,746 | 11/1952 | Chapman | 254/133 R |
| 2,970,810 | 2/1961 | Zich et al. | 254/86 R |
| 3,220,565 | 11/1965 | Wells | 254/134 |
| 3,606,246 | 9/1971 | Harrah | 254/108 |
| 3,655,161 | 4/1972 | Schueler | 248/354 P |

Primary Examiner—Othell M. Simpson
Attorney, Agent, or Firm—Herbert E. Haynes, Jr.

[57] ABSTRACT

A bumper jack of the conventional type having a lifting hook mounted on a carriage which is movable along a vertical standard by means of a ratchet mechanism, is provided with an interlock pin for securing the carriage at various locations on the standard to prevent unintentional movements thereof. Securing hook means on the carriage is provided for engaging the upper part of the bumper so that the bumper is firmly held between the lifting hook and the securing hook means to resist lateral slippage or disengagement of the lifting hook from the bumper.

5 Claims, 5 Drawing Figures

PATENTED OCT 15 1974

3,841,604

BUMPER JACK

BACKGROUND OF THE INVENTION

1. Field of the Invention

This invention relates to lifting jacks and more particularly to an improved automobile bumper jack.

2. Description of the Prior Art

Design trends directed toward longer and lower automobile body styles have necessitated the use of bumper jacks in place of the traditional axle jack to lift the vehicles for tire changing purposes and the like. Front and rear body portions extend beyond the axles, A-frames, and other usual lifting points to such an extent that access to those points is very difficult. Also, the automobile body must be raised relative to the wheels to provide adequate clearance therebetween for tire changing purposes.

Bumper jacks are standard equipment on new automobiles and are widely accepted in spite of the well known dangers of using such a device. One danger point of the prior art bumper jacks is the ratchet mechanism thereof which is used to raise and lower the lifting hook supporting carriage along the standard. These carriages have been known to slip for such reasons as excessive parts wear and accidental reversal of the carriage direction changing mechanism associated with the ratchet assembly. Another point of concern to the operator of a bumper jack is slippage of the lifting hook laterally of the bumper or other unintended disengagement of the jack from the bumper. The jack must be precisely positioned relative to the bumper and the ground surface to prevent this type of lateral slippage or other unintended disengagement. This positioning of the jack is particularly critical when the vehicle is parked on a hill which slopes in a direction transverse to the body of the vehicle.

Therefore, a need exists for an improved bumper jack which overcomes some of the problems of the prior art.

SUMMARY OF THE INVENTION

In accordance with the present invention a new and useful bumper jack is disclosed as being provided with an interlock pin which fixes the movable carriage thereof at various locations along the standard to prevent unintentional movements of the carriage.

The bumper jack of the instant invention is also provided with a securing hook means on the movable carriage for engaging the upper part of the bumper. Positioning of a bumper between the usual lifting hook and the securing hook means will firmly hold the bumper therebetween to resist lateral slippage and/or other accidental disengagement of the jack from the bumper.

A first embodiment of the securing hook means includes a spring biased lever assembly having a hook thereon for demountable engagement with the upper part of the bumper. The lever assembly is provided with a slip joint and is pivotable so that in conjunction with the spring biasing thereof, the securing hook means will automatically be adjusted for the proper length and longitudinal configuration to accommodate bumpers of various sizes and shapes.

A second embodiment of the securing hook means includes a chain mounted on the carriage and having a hook member for engaging the upper part of the bumper. The chain is adjustable as to its length to accommodate the various bumper configurations.

Accordingly, it is an object of the present invention to provide a new and useful bumper jack.

Another object of the present invention is to provide a new and useful bumper jack which is provided with an interlock pin for fixing the carriage of the jack at various locations along the length of the standard.

Another object of the present invention is to provide a new and useful bumper jack having a securing hook means mounted on the carriage of the jack for demountable engagement with the upper part of the bumper.

Another object of the present invention is to provide a new and useful bumper jack which includes a securing hook means for demountable engagement with the upper part of the bumper, the securing hook means being adjustable to accommodate various sizes and shapes of bumpers.

The foregoing and other objects of the present invention, as well as the invention itself, may be more fully understood from the following description when read in conjunction with the accompanying drawings.

DESCRIPTION OF THE PREFERRED EMBODIMENTS

Figure 1:
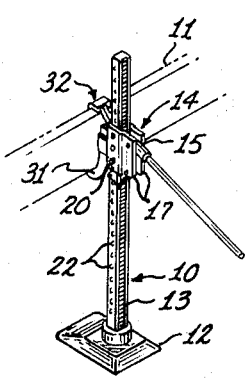
FIG. 1 is a fragmentary isometric view of an automobile bumper having the bumper jack of the present invention mounted thereon.

Referring more particularly to the drawings, FIG. 1 illustrates the bumper jack of the present invention, indicated generally by the reference numeral 10, as being employed in conjunction with an automobile bumper 11. The jack 10 is shown in FIG. 1 to include the usual base plate 12 upon which the standard 13 is mounted in the conventional manner. A carriage 14 is mounted on the standard 13 and is movable along the length thereof by means of the usual ratchet assembly 15.

Figure 2:
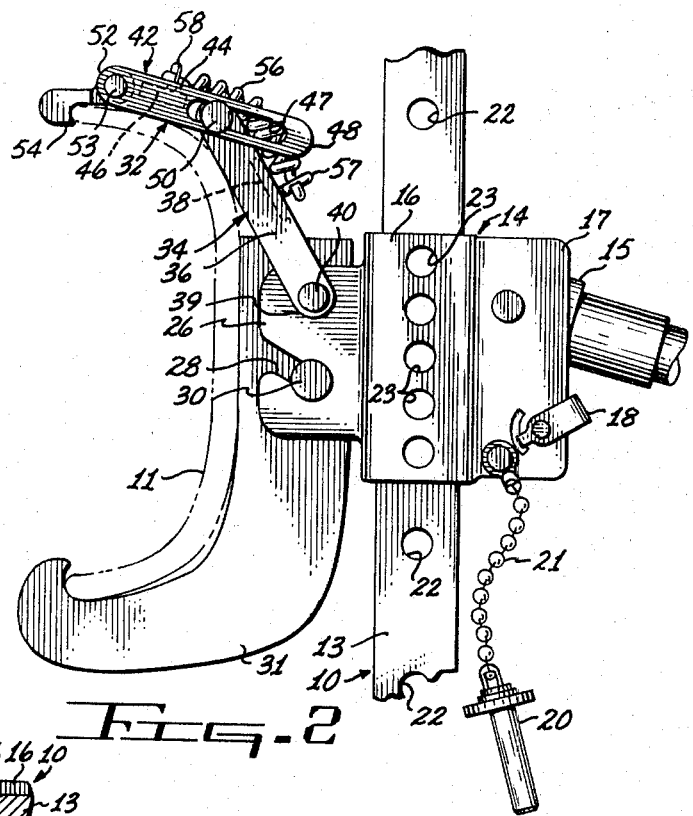
FIG. 2 is an enlarged fragmentary orthographic view of the bumper jack illustrating the lifting hook, carriage and standard thereof and showing the various features of the instant invention.
Figure 3:
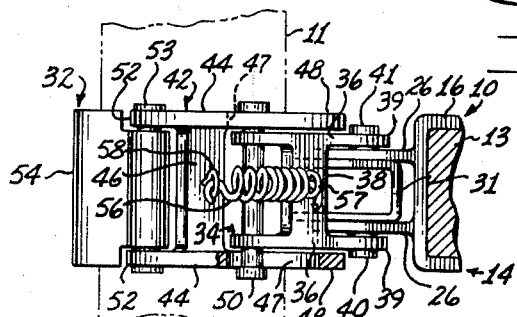
FIG. 3 is a fragmentary plan view of the apparatus shown in FIG. 2.

As seen best in FIG. 2, the carriage 14 has a tubular body 16 through which the standard 13 is axially movable in the well known manner. A pair of spaced apart flanges 17 project rearwardly from the body 16 and support the ratchet assembly 15 therebetween. A lever 18 is mounted on one of the flanges 17 which operates a suitable carriage direction reversing mechanism (not shown).

As is well known in the art, the carriage 14 is moved along the length of the standard 13 by the ratchet assembly 15 and is held in the desired position by the ratchet assembly. To insure against unintentional movement of the carriage 14 which may occur as a result of worn parts, accidental movement of the lever 18 and the like, an interlock pin 20 is provided. The pin 20 is secured to one of the flanges 17 by a chain 21 to prevent the pin from being misplaced or lost. A plurality of apertures 22 are drilled or otherwise formed in spaced increments along the length of the standard 13 and similar apertures 23 are provided in the body 16 of the carriage 14. The apertures 22 and 23 are positioned on the standard 13 and the carriage 14, respectively, so that one of the apertures 23 of the carriage 14 will align with one of the apertures 22 of the standard 13 at substantially any position of the carriage. In use, when the desired position of the carriage 14 is achieved, the pin 20 is inserted into aligned ones of the aperture 22 and 23 to prevent unintentional movements of the carriage 14.

It should be readily apparent that exact alignment of the apertures 22 and 23 may not occur at every position of the carriage. However, since precise positioning of the carriage is not critical in devices of this type, the carriage may be moved a small amount as needed to achieve the necessary alignment without any detrimental effects.

A pair of spaced apart lugs 26 are integrally formed on the body 16 of the carriage 14 and extend forwardly therefrom. Each of the lugs 26 is provided with an angularly downwardly directed slot 28 which extends from the outermost ends of the lugs toward the body 16. The slots 28 are aligned with each other for receiving trunions 30 (one shown) which project from opposite sides of a lifting hook 31. The lifting hook 31 and the above described mounting thereof are conventional in the art and many various types of hook configurations and mounting arrangements are employed. The specific details shown and described herein should not be construed as a limitation to the present invention as any of the well known lifting hooks and mounting arrangements will function equally as well with the jack of the present invention.

A securing hook means, indicated generally by the reference numeral 32 is mounted, as will be described in detail, to the lugs 26 and is adapted to grip the upper part of the automobile bumper 11 so as to firmly position the bumper between the lifting hook 31 and the securing hook means 32.

The securing hook means 32 includes a first link 34 formed of a pair of spaced apart bars 36 connected intermediate their opposite ends by a transverse plate 38. The first link 34 is connected to the carriage 14 by having the inwardly disposed end 39 of each of the bars 36 connected to a different one of the lugs 26 by pins 40 and 41 provided thereon for that purpose. The pins 40 and 41 are axially aligned and the bars 36 are loosely coupled thereto so that the first link 34 is free to pivot about the axis of the pins.

A second link 42 of substantially the same construction as the first link 34 is formed with a pair of parallel spaced apart bars 44 connected intermediate their opposite ends by a transverse plate 46. An elongated slot 47 is formed longitudinally in each of the bars 44 adjacent the inwardly disposed ends 48 thereof for pivotable and slidable engagement with a pivot pin 50 carried in the outwardly disposed ends of the bars 36 of the first link 34. Thus, the first and second links 34 and 42 are connected to each other by a joint which permits the plates to be pivoted with respect to each other and also functions as a slip joint so that the over-all length of the two links can be altered as will be hereinafter described in detail.

The outwardly disposed ends 52 of the bars 44 of the second link 42 carry a pivot pin 53 therein to which a bumper engaging hook 54 is attached.

It may now be seen that the axis of pivot pin 53, the axis of pivot pin 50 and the axis of pins 40 and 41 are all parallel with respect to each other. This arrangement permits the bending of the securing hook means 32 around the curved peripheral surface of the automobile bumper 11. The slip joint function provided at the connection between the first and second links 34 and 42 allows the securing hook means 32 to be adjusted as to its length to accommodate bumpers of various sizes.

The adjustment of the length of securing hook means 32 is accomplished automatically by a spring 56 connected on one end thereof to the plate 38 such as by an eye 57, and has its other end connected to the plate 46 by a suitable eye 58. The spring 56 will therefore longitudinally slidingly urge the second link 42 toward the first link 34 thus pulling the securing hook means 32 taut when it is attached to the bumper 11.

Figure 5:
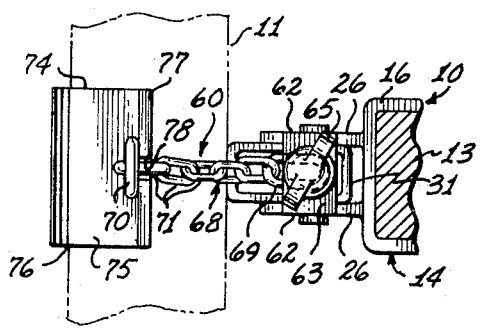
FIG. 5 is a fragmentary plan view of the apparatus shown in FIG. 4.
Figure 4:
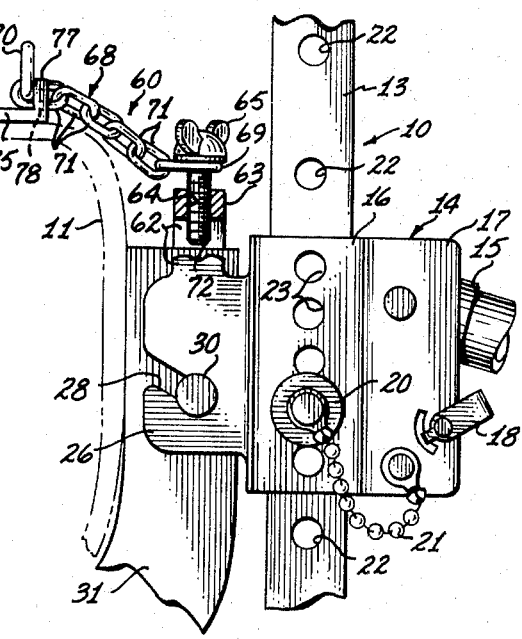
FIG. 4 is a view similar to FIG. 2 and illustrating another embodiment thereof.

A second embodiment of the securing hook means is indicated generally by the reference numeral 60 and is illustrated in FIGS. 4 and 5 of the drawing. The spaced apart lugs 26 extending from the body 16 of the carriage 14 are each provided with an upstanding arm 62 which may be formed integral therewith or otherwise attached such as by welding. The upper ends of the arms 62 are interconnected by a transverse plate 63 which has a threaded bore 64 formed therethrough for threadably receiving a wing bolt 65.

A chain 68 having end links 69 and 70 with intermediate links 71 is connected to the carriage 14 by passing the shank 72 of the wing bolt 65 through the end link 69 and threading the bolt 65 into the bore 64 of the plate 63. This mounting technique not only provides attachment means by which the chain 68 is connected to the carriage 14, but also provides means by which the chain may be drawn taut as will hereinafter be described in detail.

Bumper engaging means 74 having a body 75 on one end of which a hook 76 is formed, is also provided with an upwardly extending flange 77 on its opposite end. A vertically disposed slot 78 having an open upper end is formed in the flange 77 to provide means for demountably receiving a selected one of the links 71 of the chain 68 therein. Any one of the links 71 may be demountably inserted into the slot 78 so that the length of the chain between the bumper engaging means 74 and the carriage 14 may be altered to suit various sizes of bumpers 11.

With the chain 68 coupled between the bumper engaging means 74 and the carriage 14 as previously described, and connected to the bumper as shown best in FIG. 4, the chain is drawn taut by threading the wing bolt 65 downwardly into the bore 64 of the plate 63. When the chain 68 is drawn taut in this manner, the link 71 which is positioned in the slot 78 will slide toward the carriage 14 and bring the adjacent link into contact with the flange 77 to prevent further movement or dislodgement of the chain.

While the principles of the invention have now been made clear in the preferred embodiments, there will be immediately obvious to those skilled in the art many modifications in structure, arrangements, proportions, the elements, and the materials used in the practice of the invention, and otherwise, which are particularly adapted to specific environments and operating requirements without departing from those principles.

By way of example, the flange 77 having the slot 78 formed therein to which the chain 68 is demountably attached could be replaced with an upstanding peg (not shown) over which the selected link of chain 68 may be looped.

The appended claims are therefore intended to cover and embrace any such modifications within the limits only of the true scope of the invention.

What I claim is:

1. A bumper jack comprising in combination:
   a. a standard having a plurality of apertures formed therein in spaced increments along the length thereof;
   b. a carriage mounted on said standard and movable along the length thereof, said carriage having at least one aperture formed therein which is selectively alignable with each of the apertures of said standard by movement of said carriage along said standard;
   c. an interlock pin on said carriage for removable insertion through the aperture of said carriage and into a selected one of the apertures of said standard to prevent unintentional movement of said carriage along said standard;
   d. lifting hook means mounted on said carriage, said lifting hook means engagable with the bottom portion of an automobile bumper; and
   e. securing hook means mounted on said carriage and engagable with the upper portion of the automobile bumper for demountably fixedly securing the bumper between said securing hook means and said lifting hook means when the bumper is positioned therebetween, said securing hook means comprises,
      i. a first link pivotably connected on one end thereof to said carriage,
      ii. a second link pivotably connected on one end thereof to the other end of said first link and longitudinally movable with respect thereto,
      iii. biasing means interconnecting said first link and said second link for longitudinally urging said second link toward said first link, and
      iiii. a hook pivotably connected to the other end of said second link.

2. A bumper jack as claimed in claim 1 wherein said first link comprises:
   a. a pair of spaced apart bars disposed in parallel relationship with respect to each other;
   b. a transverse plate attached between said bars intermediate the ends thereof;
   c. means on said plate for coupling one end of said biasing means thereto; and
   d. a pivot pin mounted between said bars adjacent to the ends thereof which are outwardly disposed with respect to said carriage.

3. A bumper jack as claimed in claim 1 wherein said second link comprises:
   a. a pair of spaced apart bars disposed in parallel relationship with respect to each other, each of said bars having an elongated slot formed longitudinally therein adjacent to one end thereof;
   b. a transverse plate interconnecting said bars, said plate attached to each of said bars intermediate the ends thereof; and
   c. means on said plate to which one end of said biasing means is connected.

4. A bumper jack comprising in combination:
   a. a standard having a plurality of apertures formed therein in spaced increments along the length thereof;
   b. A carriage mounted on said standard and movable along the length thereof, said carriage having at least one aperture formed therein which is selectively alignable with each of the apertures of said standard by movement of said carriage along said standard;
   c. an interlock pin on said carriage for removable insertion through the aperture of said carriage and into a selected one of the apertures of said standard to prevent unintentional movement of said carriage along said standard;
   d. lifting hook means mounted on said carriage, said lifting hook means engagable with the bottom portion of an automobile bumper; and
   e. securing hook means mounted on said carriage and engagable with the upper portion of the automobile bumper for demountably fixedly securing the bumper between said securing hook means and said lifting hook means when the bumper is positioned therebetween, said securing hook means comprising,
      i. a chain having an end link on each of the opposite ends thereof and a plurality of intermediate links,
      ii. a bumper engaging hook having means thereon for demountably attaching a selected one of the intermediate links of said chain thereto, and
      iii. attachment means on said carriage for connecting one of the end links of said chain thereto, said attachment means comprising,
         a pair of spaced apart arms attached to said carriage and extending therefrom,
         a transverse plate interconnecting the extending ends of said pair of arms, said plate having a threaded bore formed therein, and
         a bolt having a threaded shank which passes through the end link of said chain and into threaded engagement with the bore of said plate, said bolt threadably movable in the bore of said plate for adjusting the distance between the end link of said chain and said plate.

5. A bumper jack as claimed in claim 4 wherein the means on said bumper engaging hook for attaching a selected one of the intermediate links of said chain thereto comprises an upwardly extending flange having a vertical slot formed therein into which the selected one of the intermediate links of said chain is demountably positioned.

* * * * *